United States Patent [19]

Damoci

[11] Patent Number: 4,630,313

[45] Date of Patent: Dec. 16, 1986

[54] CABLE SENSOR FOR SENSING A DC SIGNAL FROM A CABLE HEADEND

[75] Inventor: Joseph A. Damoci, Beltsville, Md.

[73] Assignee: Control Data Corporation, Minneapolis, Minn.

[21] Appl. No.: 763,748

[22] Filed: Aug. 8, 1985

[51] Int. Cl.[4] .................... H04B 17/00; H04H 9/00; H04N 7/10
[52] U.S. Cl. ............................................ 455/2; 455/4; 358/84; 358/86
[58] Field of Search ........................................ 455/2–6, 455/67; 358/84, 86; 333/24 R, 24 C

[56] References Cited

U.S. PATENT DOCUMENTS 4,058,829  11/1977  Thompson ............................ 455/2
4,443,815  4/1984  Hempell ............................... 455/4

*Primary Examiner*—Jin F. Ng
*Attorney, Agent, or Firm*—Joseph A. Genovese; Edward P. Heller, III

[57] ABSTRACT

A cable sensor for sensing a DC signal sent by a cable system's headend in order to switch a converter from converting one set of frequencies to another. When the cable sensor detects such a DC signal, it provides isolation from the DC for a cable tv ratings monitor connected to the cable system and further provides a signal to the monitor that the signal has occurred in order for the monitor to switch frequency/program assignments.

4 Claims, 2 Drawing Figures

CABLE SENSOR FOR SENSING A DC SIGNAL FROM A CABLE HEADEND

BACKGROUND OF THE INVENTION (1) Field of the Invention

The invention relates generally to the field of tv ratings monitoring devices and more particularly to devices to determine ratings on cable systems.

(2) Brief Description of the Prior Art

Prior cable systems, in order to bring to the home 100+ channels, have provided more than one cable because each cable's capacity was approximately 66 channels..In order for a ratings service to monitor these cable systems, the service provided monitors having two cable inputs and an internal A/B switch to select which cable was presently being viewed.

Newer cable systems have provided fewer channels and thus have included only one cable. Some of these services, in order to provide security for their premium programming services, have converters which can sense a DC signal, typically on the order of 16 volts, and switch from amplifiying one set of frequencies to another, one set having premium or pay per view programming and the other not.

Rather than design a whole new cable monitor for these newer switchable systems, it is desirable to adapt an existing monitor. However, the existing monitors have no means for sensing the DC switch signal, and further, may have circuit vunerability to such a DC signal.

SUMMARY OF THE INVENTION

The invention comprises providing a remote sensor for sensing the DC signal transmitted from the headend and, in turn, signalling conventional TV cable monitor having the A/B cable switch capability to switch from A to B or vice-versa, while at the same time providing DC isolation from the monitor. The sensor at the same time transmits the orginal signal, including both RF and DC components to the cable converter.

The remote sensor accomplishes the above by providing capacitors to couple the RF from the scale into the TV monitor and also out of the monitor and to the cable converter. Inductors to couple the DC signal from the cable to the cable converter and also a sensor comprising an LED and a photosensitive element, which when activated by the presence of DC, grounds the A/B switch in the monitor, swithing the monitor's frequency assignments from one set of frequencies to another.

DESCRIPTION OF THE PREFERRED EMBODIMENT

The conventional cable TV ratings monitor 20 intercepts the signal from the cable system prior to the cable converter, where it may scan the frequencies of the cable system to determine which is being viewed on the tv set 40. One method of doing this it to briefly interrupt whatever is being transmitted by cable system's headend on a particular frequency and inject a special signal. By monitoring the tv's circuits (the probe input to the TVM 20), the monitor may determine whether this special signal is being coupled through the converter to the tv set. If not, the next frequency is scanned.

These cable tv monitors typically have two cable inputs and an A/B switch in order for it to monitor both cables of a two cable system, although it may work just as well with only one cable. In the newer systems having only one cable but two sets of frequencies which may be relayed to the tv set under the control of the headend by means of a DC signal, the conventional meter has no means to detect the DC signal and does not know in advance which set of frequencies are presently being relayed to the tv set. However, by means of the DC sensor 10 which can detect the DC signal and alert the monitor, the monitor can be programmed to interpret the cable input as one set of frequencies when the switch is set to A and another set when the switch is set to B. This eliminates the necessity of designing a whole new cable monitor for these systems having the remote DC signalling and frequency switch capability.

Figure 1:
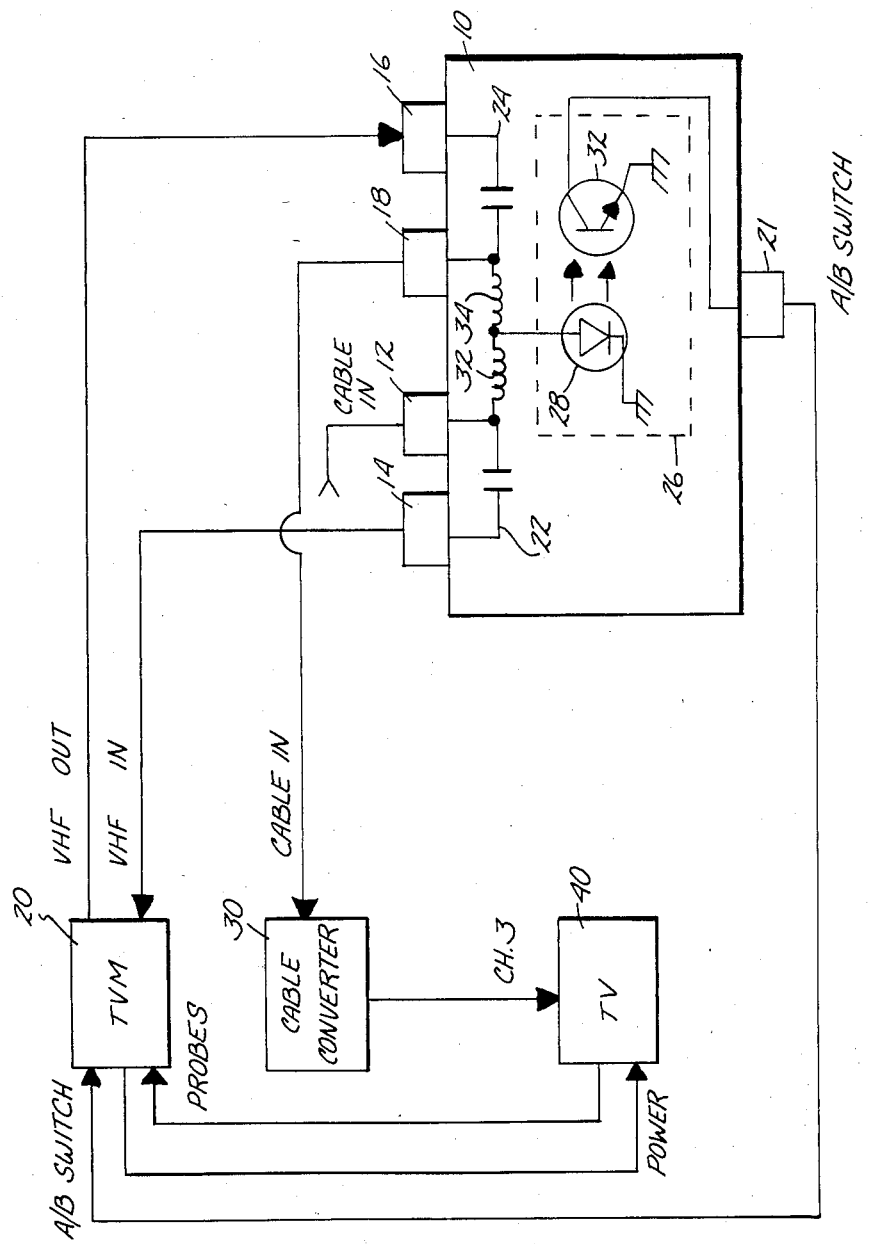
FIG. 1 shows the remote DC sensor and its connections to a conventional A/B tv monitor.

Thus, in the preferred embodiment shown in FIG. 1, the single cable is input on Cable In input 12 to the remote sensor 10, which couples the RF component of the signal (the TV video and audio of all frequencies (channels)) to monitor 20 via capacitor 22 and VHF IN output 14. There, the signal of one channel of frequency may be momentarily interrputed and the special signal substituted. The monitor outputs the complete RF signal, which may include the special signal at one of the cable frequencies, back to the sensor via VHF OUT and input 16. In the sensor, the RF is coupled to the cable converter 30 via capacitor 24 and output 18. Thereafter, the cable converter selects, via conversion, one of the frequencies (according to the wishes of the viewer) and outputs the selected frequency to the tv set VHF inputs at a frequency corresponding to VHF channel 3 (normally, channel 2 and 4 are alternate channels).

These capacitors, 22 and 24, provide DC isolation of the monitor 20 while permitting RF passthrough. Thus, through the circuit described, the cable's RF signals, but not the DC signal, are coupled to the converter 30 through the monitor 20. The DC signal, which is necessary for the converter to successfully switch amplifiers, is connected to the converter, but not the monitor 20, from the cable input 12 via inductors 32 and 34. The inductors pass DC but choke off RF.

In order to sense the presence of the DC signal and maintain DC isolation of the monitor, the junction of the inductors is coupled to a LED and photosensitive transitor combination 26. The inductors 32 and 34 isolate the photo-operated combination 26 from activation by the RF signal. The photo-operated combination 26 comprises LED 28 and photosensitive transitor 32. The LED is activated by the presence of the DC signal. The transitor is activated by light from LED 28 and grounds its output 20, thus providing a signal, via output 21, to TVM 20 to switch its A/B switch.

Figure 2:
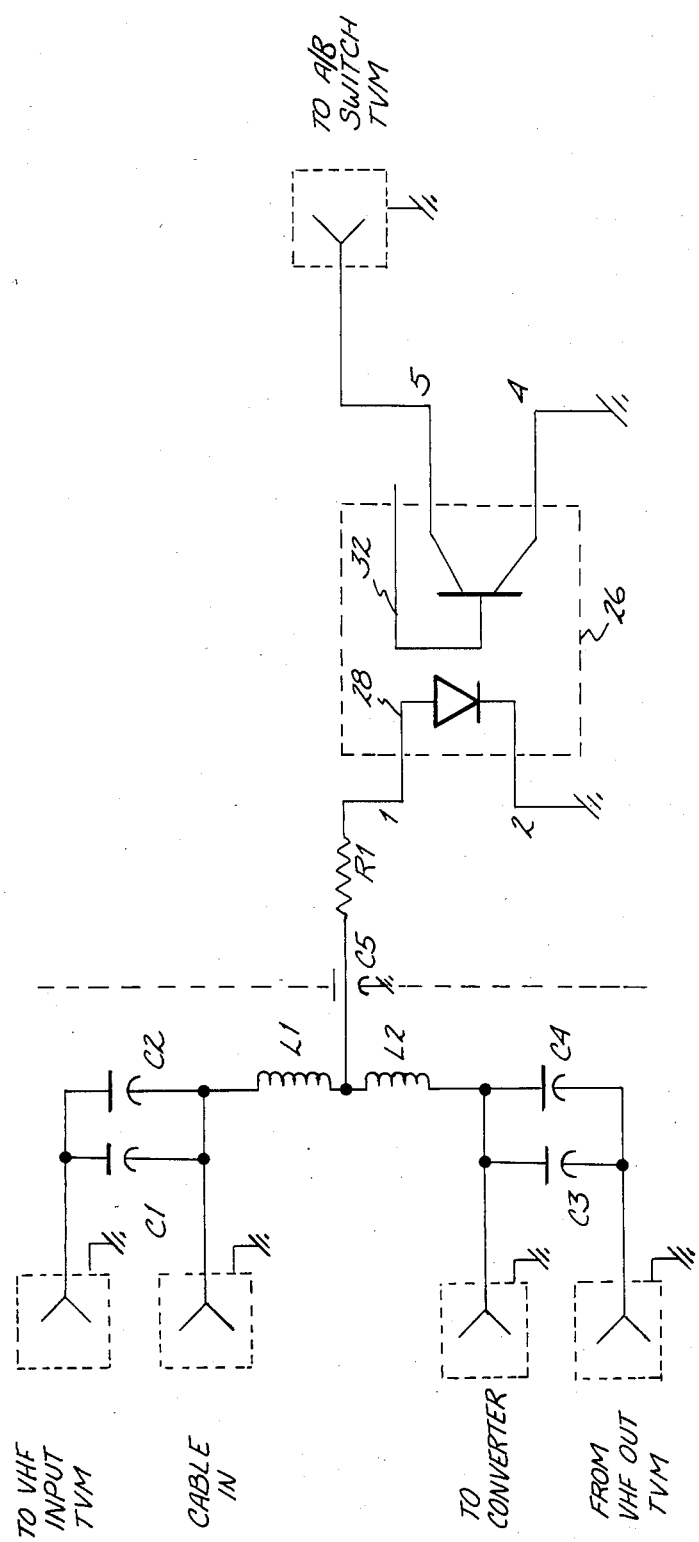
FIG. 2 shows a schematic of the preferred remote sensor.

A preferred sensor 10 circuit is shown in FIG. 2. This circuit has five grounded coaxial cable inputs and outputs, to wit, Cable In, To Converter, To VHF Input TVM, From VHF Output TVM, and To A/B Switch TVM. The Cable In input is coupled to the VHF input TVM output via parallel capacitors C1 and C2. Likewise, the From VHF Out TVM input is coupled to the To Converter output via parallel capacitors C3 and C4. The parallel capacitors in each coupling reduce RF inductance one would find with only one capacitor of equal capacitance. The capacitance of each of these capacitors is 56 picofarad.

The Cable In input is also connected to the To Converter Output via inductors L1 and L2, which each are 3.9 micro henries. The inductors couple DC from the cable to the converter. The center of the inductors is in turned connected through a shielded connector, which is coupled to ground through capacitor C5 (0.01 microfarad), and further through a resistor R1 (9.1 kiloohms) to a type 4N35 photoactive coupler available from the Hamilton Avnet, located in Columbia, Md. The combination of the inductors L1 and L2 with capacitor C5 serve to choke RF from activating the photocoupler, while the resistor R1 scales the DC (which in most cable systems is approximately 16 volts) to protect the 4N35 from overload.

As shown, the photocoupler 26 is comprised of an LED 28 connected to ground and an photosensitive transistor 30, also connected to ground. When activated, the transitor grounds the A/B Switch in the TVM.

The enumeration and description of the elements of the preferred embodiment should not be taken as a limitation of the scope of the appended claims, in which I claim:

1. A sensor for sensing a DC signal transmitted from a cable headend and signalling the presence of the DC signal to a cable tv ratings monitor while isolating the tv monitor from the DC signal, said monitor having a VHF input, VHF output and a A/B switch, said sensor comprising:

a cable input for receiving cable TV signals;

an output coupled to the VHF input of the monitor;

a capacitor means for coupling the cable input to said output for providing an RF connection and DC isolation between the cable input and said output;

an input coupled to receive the VHF output of the monitor;

a converter output;

a capacitor means for coupling the input which is coupled to receive the VHF output of the monitor to the converter output for providing an RF connection and DC isolation between said input and the converter output;

inductor means for connecting the cable input to the converter output for providing a DC connection and RF choke between the cable input and converter output; and DC sense means, connected to said inductor means, for sensing the presence of a DC signal and signalling such presence to said cable tv monitor A/B switch while isolating the A/B switch from said DC signal.

2. The sensor of claim 1 wherein said DC sense means comprises photocoupler means.

3. The sensor of claim 3 wherein said photocoupler means comprises an LED means and a photosensitive transitor.

4. The sensor of claim 1 wherein each of said capacitor means comprises a plurality of parallel connected capacitors.

* * * * *